United States Patent [19]

King

[11] 4,361,834
[45] Nov. 30, 1982

[54] SAFETY ALARM DEVICE

[76] Inventor: Johnnie L. King, Rte. 1, Box 320, Wagarville, Ala. 36585

[21] Appl. No.: 968,987

[22] Filed: Dec. 13, 1978

[51] Int. Cl.³ .............................................. G08B 21/00
[52] U.S. Cl. .............................. 340/575; 200/61.58 R; 200/DIG. 2; 220/306; 340/52 R; 340/576; 340/636; 340/693
[58] Field of Search ............... 340/573, 574, 575, 576, 340/407, 636, 693, 52 R, 53; 200/DIG. 2, 61.58 R; 180/99, 273, 272; 312/7, 294; 220/306, 20; 325/355

[56] References Cited

U.S. PATENT DOCUMENTS

| | | | |
|---|---|---|---|
| 1,296,088 | 3/1919 | Jones | 200/DIG. 2 |
| 1,558,076 | 10/1925 | Chamberlain | 340/636 |
| 2,909,631 | 10/1959 | Stamm et al. | 340/693 X |
| 3,049,188 | 8/1962 | Giannetti | 180/272 |
| 3,054,868 | 9/1962 | Phillians | 340/575 |
| 3,422,358 | 1/1969 | Sabonis | 312/7 R |
| 3,553,585 | 1/1971 | Robertson et al. | 312/7 R X |
| 3,701,016 | 10/1972 | Bennett et al. | 325/355 |
| 3,718,921 | 2/1973 | Johnson | 340/575 |
| 3,861,349 | 1/1975 | Conley | 340/575 |
| 3,953,831 | 4/1976 | Estrada | 340/575 |
| 3,964,045 | 6/1976 | Conley | 340/575 |
| 3,999,177 | 12/1976 | Greene | 340/576 X |
| 4,059,830 | 11/1977 | Threadgill | 340/575 |
| 4,111,329 | 9/1978 | Lampman | 220/306 |
| 4,119,811 | 10/1978 | Moricca et al. | 340/407 |
| 4,163,496 | 8/1979 | Dogliotti | 220/306 X |

FOREIGN PATENT DOCUMENTS 1193583  5/1965  Fed. Rep. of Germany .
1480243  7/1977  United Kingdom ......... 200/DIG. 2

Primary Examiner—Thomas A. Robinson
Assistant Examiner—Joseph E. Nowicki
Attorney, Agent, or Firm—Donal B. Tobin

[57] ABSTRACT

A self-contained, portable, safety alarm device adapted to be worn on a user's hand for providing an alert signal when, through drowsiness or otherwise, the user's hand relaxes. The device includes at least a partial glove including a fingertip portion adapted to be worn on at least one fingertip of the user, a wristband portion adapted to be worn about the user's wrist, and connecting means connecting the fingertip portion to the wrist portion.

The wristband supports a housing which includes a battery, an alarm device energized by the battery, and an on-off switch. The fingertip portion supports a switch electrically connected to the battery and alarm device which provides an open circuit when the user holds the switch against a contact surface, for example, a steering wheel of a vehicle, and provides a closed circuit to permit the battery to energize the alarm device when the user's hand relaxes away from the contact surface. The wristband includes an optional test light for testing the charge condition of the battery and an earphone apparatus for connecting the alarm device directly to the user's ear.

The safety alarm device is particularly adapted for use by long distance drivers, machine operators, and others that may be required to stay alert over long periods of time.

6 Claims, 5 Drawing Figures

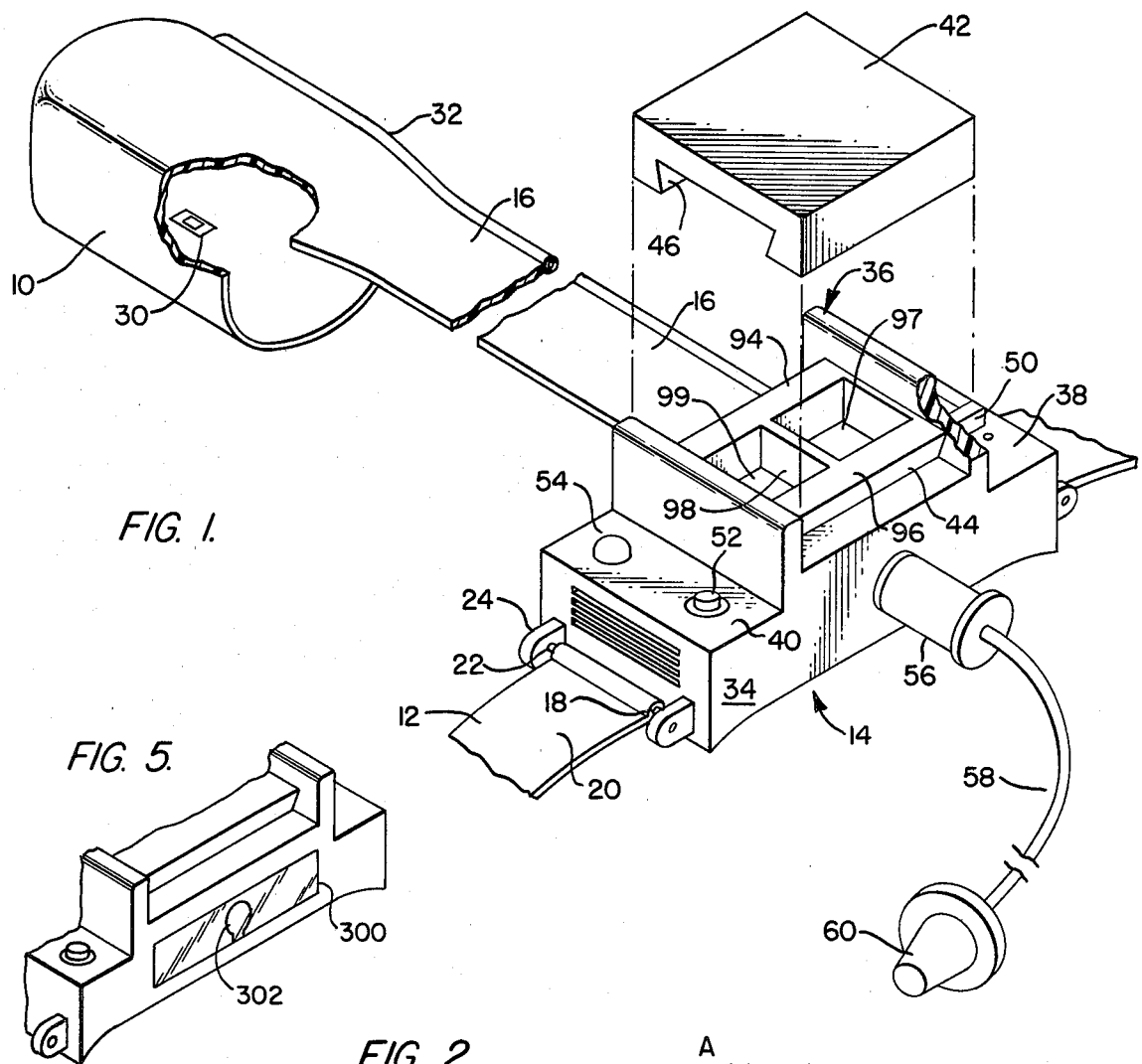
FIG. 1.
FIG. 5.
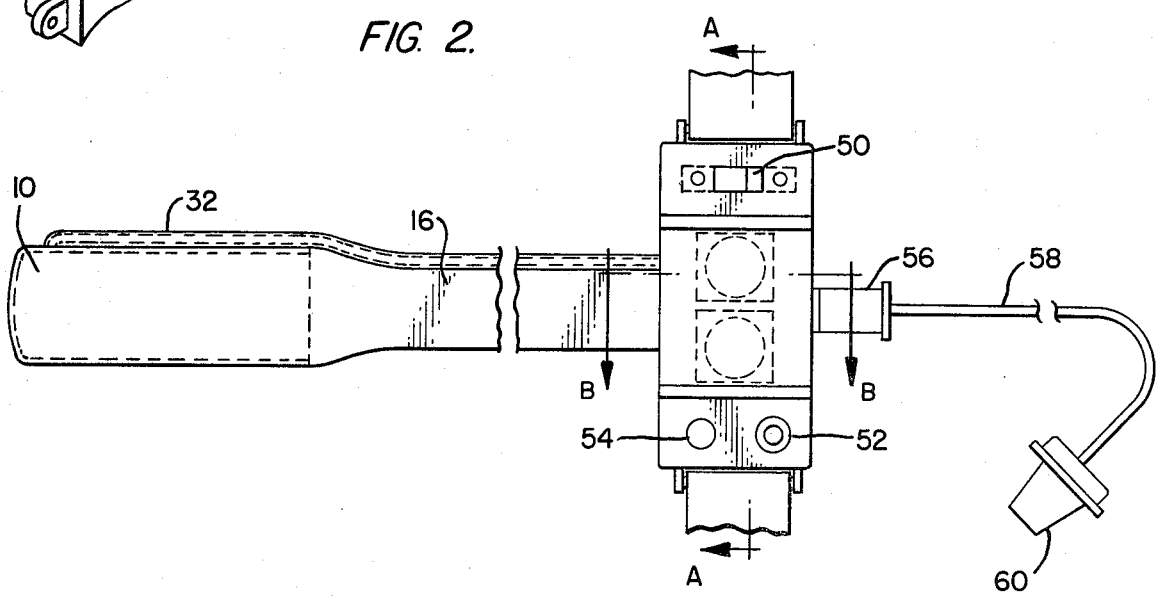
FIG. 2.

SAFETY ALARM DEVICE

BACKGROUND OF THE INVENTION

The present invention relates to a safety alarm device and more particularly to a portable, self-contained alarm device adapted to be worn on the user's hand for providing an alert signal when, through drowsiness or otherwise, the individual's hand relaxes.

There are a number of devices that may be worn on or about the body to sense the wearer's alertness and to sound an alarm when the alertness level diminishes. One such device is shown in the U.S. Pat. No. 4,059,830 which includes a sleep alarm device worn on the user's hand to prevent him from falling asleep while smoking in bed or while driving an automobile. The device includes two metal rings worn on adjacent fingertips, like thimbles, and connected by an elastic band. The user must stretch his fingers apart against the pressure of the elastic band to keep the two thimbles from touching and sounding a buzzer. Stretching the fingers apart in this manner is difficult for most people and is likely to quickly tire the user's hand.

In U.S. Pat. No. 3,861,349, an operator alerting device is disclosed which includes a glove worn on the user's hand to which is attached a needle arrangement for pricking the flesh of the wearer should his hand slip from the wheel and rest, for example, against his thigh. A similar device is disclosed in U.S. Pat. No. 3,964,045, which includes a glove-type arrangement to which one end of a cord is attached while the other end of the cord is attached to the switch of an alarm device mounted on the vehicle above the steering wheel. The length of the cord is adjusted so that it is loose when the operator's hand is on the steering wheel but becomes taut when the operator's hand drops, for example, to his or her thigh creating a tension on the switch which operates the alarm device. This apparatus requires the operator to be connected to his vehicle in what could be a clumsy fashion, especially if the operator attempts to turn the wheel.

In the past, various kinds of fingertip controls have been suggested which permit remote operation of various kinds of devices. In U.S. Pat. No. 1,296,088, a fingertip attachment is disclosed which permits the operator of a car to blow the horn without lifting his hand from the perimeter of the steering wheel to the center of the steering wheel, where the horn is often located. A similar type of device which permits the user to activate a machine by closing his hand around the handle is shown in the German Pat. No. 1,193,583.

Other devices sense the motion of the operator's head to initiate an alarm condition as, for example, connecting a mercury-type switch to the driver's eyeglasses, so that when the head tips, the switch activates an alarm and turns off the ignition (U.S. Pat. No. 3,953,831) or a switch supported under the driver's chin by means of a hook which can be attached to the driver's clothing, so that when the driver's head tips the switch is activated and sounds an alarm. (U.S. Pat. No. 3,054,868) Because these devices appear to require a driver to concentrate on keeping his head still to avoid erratic triggering of the alarm, it appears that they could add to the fatigue which they are intended to protect against and inhibit his normal activity.

There is a need for a portable, self-contained, ruggedly constructed alarm device which may be comfortably worn by the user without fatigue and without unduly confining his normal activity. It is also desirable that the device not require connection to the vehicle which is being operated by the user.

SUMMARY OF THE INVENTION

The present invention relates to a safety alarm device, which is completely portable, self-contained, ruggedly constructed and battery operated. It does not depend for its operation on connection to the vehicle or machinery which is being operated by the wearer. It may be conveniently used without confining the user's normal activity and without creating any additional fatigue or strain on the user. The device is adapted to be worn on the user's hand for providing a visible, audible or tactile alerting signal when through drowsiness or otherwise, the user's hand relaxes.

The device employs at least a partial glove which includes a fingertip portion adapted to be worn on at least one fingertip of the user, a wristband portion adapted to be worn about the user's wrist and a runner connecting the fingertip portion and the wristband portion. The wristband portion may be adjustable to fit various size wrists in the fashion of a watchband. The fingertip portion, wristband portion, and runner may be made of leather, plastic, or some other suitable material. The glove may be constructed as a unit of one material or different parts of the glove may be made of different suitable materials. The runner may also be adjustable for hands of different lengths. It is desirable that the inside of the fingertip portion which contacts the finger of the user have a high coefficient of friction so that it will be readily retained on the user's finger. The wristband may be a continuous elastic band or may be a conventional two-piece wrist watch type band or other type of suitable bracelet.

The wristband portion includes a housing made preferably of high impact plastic which defines a first cavity for housing an alarm device like an electric buzzer or bell and a second cavity for one or more storage batteries. The first cavity is provided with a removeable cap to permit ready access to the signal alarm device and with access channels to permit the sound waves generated by the alarm device to be transmitted from the housing. The second cavity is provided with a snap-on cover to provide ready access to the batteries. Internal electrical connections are provided. The device also includes an optional light included on the housing to permit the user to easily check the charge condition of the battery. An optional earphone is also included for connecting the audible alarm device directly to the user's ear. Alternatively the alarm device may be a steady or blinking light or even a vibrating unit placed in the housing and adapted to be felt by the user's wrist.

The safety alarm device of the present invention is particularly useful for long distance truck or automobile drivers, machine operators, and others who may be required to stay alert for long periods of time.

DESCRIPTION OF THE DRAWINGS

Additional features and advantages of the present invention will become apparent from the following detailed description of the preferred embodiments of the invention taken in conjunction with the accompanying drawings in which:

FIG. 1 shows an exploded persepective view of the invention;

FIG. 2 shows a plan view of the apparatus of FIG. 1;

FIG. 5 shows an alternative embodiment of part of the apparatus of the present invention.

DETAILED DESCRIPTION OF THE INVENTION

Figure 3A:
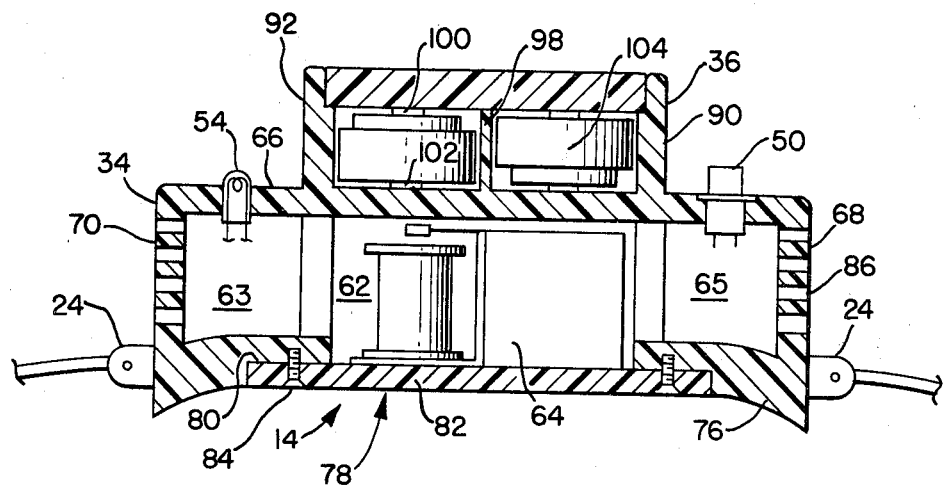
FIG. 3a shows a sectional view taken along line A—A in FIG. 2.

Referring now to FIG. 1 there is shown a perspective view of the safety alarm device of the present invention which includes a fingertip portion 10 adapted to fit around at least one fingertip of the user; a wristband portion 12 adapted to fit about the user's wrist in fashion of a wristwatch band; a housing 14 supported on the user's wrist by wristband 12 and a connecting portion or runner 16 connecting fingertip portion 10 to housing 14.

The wristband may be attached to the housing in a variety of well-known ways in which wristwatch bands are attached to a wristwatch. An opening 18 may be provided transversely through an end 20 of wristband 12 for accomodating a spring-loaded pin 22 which is then supported by wristband lugs 24 attached to housing 14. Alternatively a one-piece elastic wristband (not shown) threaded through slots (not shown) in the housing 14 to hold the housing and the wristband together. In a further alternative embodiment the wristband may be integral with housing 14.

Fingertip portion 10 may be made of molded polystyrene, leather, or some other suitable material that is easily fashioned to fit about at least one of the user's fingertips. Fingertip portion 10 is connected to housing 14 by runner 16 which may be integral with tip 10 or maybe a separate piece affixed to tip 10 and housing 14. Runner 16 may also be adjustable to accomodate hands of different lengths.

A pressure contact electrical switch 30 is mounted on fingertip portion 10 in such a way as to permit the switch to be activated when the user places his finger against a contact surface or against the palm of his hand when he closes his hand to make a fist. Contact switch 30 may be a spring-loaded normally open switch which provides an open circuit when the user's hand is out of contact with a contact surface. The switch may be entirely embedded in the wall of the fingertip portion 10 so that it is electrically insulated from contact with the user's hand and isolated from the external environment in order to keep it clean and safe from damage during use. Alternatively, fingertip portion 10 may have a slot through which a portion of the contact switch extends to directly engage the contact surface.

The contact switch 30 is electrically connected to the remaining elements of the safety alarm device which will be subsequently described, by means of electrical wires which may be contained in flexible tubing 32 which extend from fingertip 10 portion to housing 14. Tubing 32 may be bonded or otherwise affixed to the outside of fingertip portion 10 and connecting runner 16 or, alternatively, tubing 32 can be integrally disposed within the wall of the molded polystyrene tip 10 and runner 16.

Still referring to FIG. 1, housing 14 includes a hollow base portion 34 which is supported by wristband 12 adjacent to user's wrist and a hollow cap portion 36 integrally supported on base portion 34. Cap portion 36 extends transversely across base portion 34 but extends only part way along base portion 34 in the longitudinal direction to provide for platforms 38 and 40. The top of cap portion 36 is open. Top cover 42 fits over top portion 36. Housing cap portion 36 and top cover 42 are provided with cooperating attachment means such as a "V" flange and "V" slot which will be described in connection with FIGS. 3a and 3b. Top cover 42 is preferably made of flexible high-impact plastic which will permit top cover 42 to easily snap on to housing cap portion 36.

Referring now to FIG. 2 a miniature on-off slide switch 50 is provided on platform 38. A miniature pushbutton momentary contact switch 52 is provided on platform 40 along with testlight 54 which my be a grain of wheat lamp. As will be described in a later portion of the specifications, the charge condition of the battery which powers the safety alarm device of the present invention can be tested by pushing the push button switch 52. If the testlight 54 lights, that will indicate the condition of the battery is satisfactory for further operation of the device; if not, the battery must be replaced.

For an audible alarm device as used with this preferred embodiment, a miniature earphone plug 56 is provided in the back of housing base 34 which is connected by means of an earphone cord 58 to earphone 60. The earphone cord 58 is of a length which will permit earphone 60 to be comfortably worn about the user's ear without unduly confining the normal motion of the user's hand on which the safety alarm device of the present invention is worn.

Figure 3B:
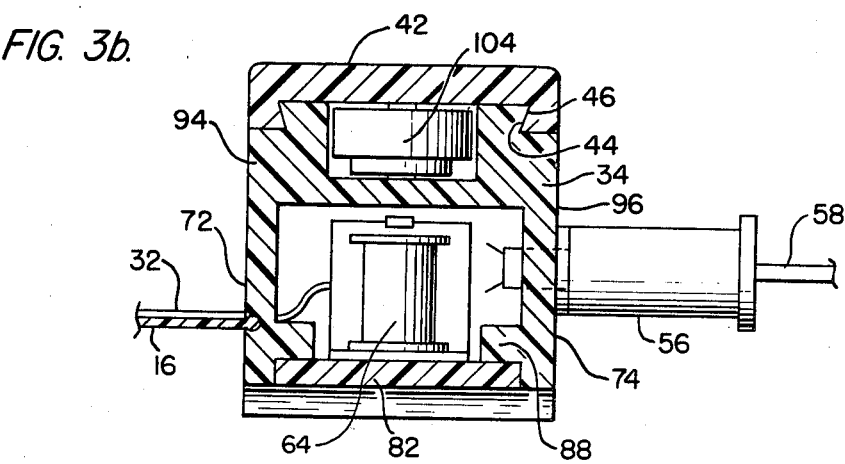
FIG. 3b shows a sectional view taken along the line B—B in FIG. 2.

Referring now to FIGS. 3a and 3b, the construction of housing 14 will be described in detail. Referring particularly to FIG. 3a, it can be seen that housing base 34 is hollow and provides a generally rectangular cavity 62 in a central portion of which alarm 64 which may be a miniature solid state electronic buzzer, is housed. Housing 34 includes a top wall 66 the outer surface of which includes platforms 38 and 40, end walls 68 and 70, sidewalls 72 and 74 and bottom 76. Bottom wall 76 includes an opening 78 surrounded by a recess 80, cover plate 82 to which buzzer 64 is attached is flush mounted over opening 78 in recess 80 by means of screws 84 which are threaded into bottom 76 to enclose cavity 62. A number of slots 86 are provided in end walls 70 and 68 to permit the sound produced by buzzer 65 to exit from cavity 62 along channels 63 and 65.

As can be best seen in FIG. 3b, side walls 74 and 72 support inwardly extending flanges 88 against which coverplate 82 rests. Bottom wall 78 may be contoured to more comfortably fit against the user's wrist. Cover plate 82 is easily removeable by means of screws 84 to permit repair or replacement of buzzer 64.

Top wall 66 of base housing 34 also forms the bottom wall of housing cap portion 36. Cap housing 36 also includes transverse walls 90 and 92 which extend completely across housing base 34. Sidewalls 94 and 96 of housing cap portion 36 extend up continuously with side walls 72 and 74 of housing base 34.

As can be seen best in FIG. 3b, top cover 42 snaps onto the top of cap housing 36 and is held in place by means of double "V"-flanges 44 and slot 46 respectively disposed on the outside surfaces of side walls 94 and 96 and on the inside surfaces of top cover 42. The outer surfaces of side walls 94 and 96 slant inward to provide "V" flanges 44. Top cover 42 includes a longitudinal slot whose sides slant to provide a cooperating "V"-slot 46.

Housing cap 36 is hollow and is divided in two by a wall 98 extending transversely across base housing 34 to divide cap housing 36 into two cavities 97 and 99 in which are housed storage batteries 104 which are preferably two wafer-type batteries each providing one and one-half volts and approximately ½ inch in diameter as manufactured by Eveready Company, Mallory Company, or other reputable manufacturers.

Snap on top cover 42 provides connections 100 and 102 respectively for batteries 104.

The entire housing is preferably made of high-impact durable plastic such as polystyrene molded to the desired shape preferably in one piece. Top cover 42 and cover plate 82 may be made of a similar material. On-off switch 50, push button 52 and test light 54 are mounted in holes provided respectively in platforms 38 and 40. Battery contacts 100 and 102 extend through wall 66. Earphone cord 58 extends through earplug 56 into cavity 62 as do electrical connection wires 32 extending from contact switch 30. These electrical elements are then wired together inside cavity 62 in a fashion which will now be described in connection with FIG. 4.

Figure 4:
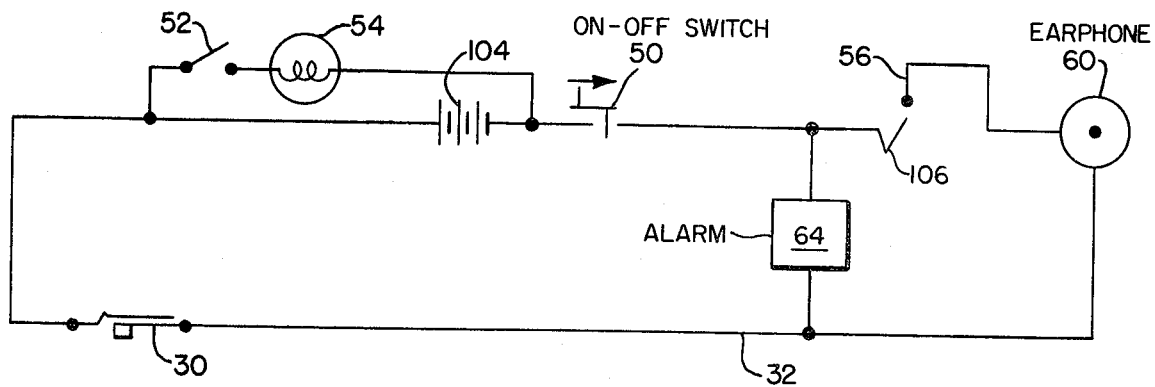
FIG. 4 shows a schematic representation of an electric circuit of the present invention.

Referring now to FIG. 4 there is shown a schematic representation of the electrical circuit used in conjunction with the present invention. Contact switch 30 is connected in series with batteries 104, on-off switch 50 and alarm device 64. Push button 52 and test light 54 are connected in parallel with this circuit so that when push button switch 52 is closed, test light 54 will illuminate if the charge condition of battery 104 is satisfactory. On the other hand, if the charge on batteries 104 has run down, test light 54 will not light up when push button switch 52 is closed. When this occurs, cover top 42 may be easily removed so that the batteries may be replaced. A jack 106 is connected in parallel in this circuit so that when earphone plug 56 is connected, the sound emitted by an audible alarm device like buzzer 64 will be diverted to earphone 60 directly to the ear of the user.

In operation, the safety alarm device of the present invention is affixed about the user's hand by strapping wristband 12 about the user's wrist with housing 14 supported on wristband 12. Fingertip portion 10 is placed over one or more of the user's fingertips with the soft portion of the user's fingers abutting switch 30. The length of runner 16 is then adjusted so that fingertip portion 10 and housing 14 may be comfortably worn by the user. The user turns switch 50 to the "on" position. When the user's hand is placed against the contact surface, for example the steering wheel of a vehicle, contact switch 30 engages the steering wheel and remains open so that the previously described electric circuit is open and alarm device 64 is not energized by batteries 104.

If the user's hand relaxes so that contact switch 30 is released from engagement with the steering wheel, contact switch 30 will close providing a closed circuit between the battery and alarm device 64 (for example a buzzer) so that the buzzer will sound and alert the driver.

It can be seen that this safety alarm device of the present invention can be comfortably worn and conveniently used by a driver without confining his normal activity. It is particularly advantageous that contact switch 30 is maintained open against the steering wheel by the normal pressure of the driver's hand on the steering wheel. It is, therefore, not necessary for the driver to exert any unusual force on the device. The user's body need not be maintained in any particular orientation or posture so that the user is not required to concentrate on the alarm device but may go about his task in the normal fashion. Thus, the present invention does not add to the user's fatigue.

In an alternative embodiment as also shown in FIG. 1 alarm device 64 may be a visual device 64' such as a constant or blinking light which may be mounted on platform 38 or 40. It may be desirable in this embodiment to place a window 300 in housing base 34 in the vicinity of earphone plug 56 of the embodiment of FIG. 1. The window may be covered with a translucent material such as plastic, to permit the light 302 to be placed safely inside the housing.

In still another alternative embodiment, alarm device 64 may be a vibrating apparatus. In this case cover 82 may be replaced with a thin membrane so that the vibration may easily be felt by the user's wrist.

While in the foregoing detailed description there has been described and shown the preferred embodiments of the invention, various modifications will be apparent to those skilled in the art to which this invention relates without departing from the scope of this invention. Accordingly, it is not desired to limit the invention except as in the appended claims

I claim:

1. A self-contained, portable safety alarm device for use by vehicle drivers and adapted to be worn on the hand of a user grasping the controls of the vehicle, for providing an alarm signal when, through drowsiness or otherwise, the user's grasp relaxes and the user's fingers move away from the contact surface of said vehicle controls, comprising:

at least partial glove means including fingertip means adapted to be worn on at least one fingertip of the user;

wrist band means adapted to be worn about the user's wrist;

connecting means connecting said fingertip means and said wrist band means;

a two part housing adapted for attached to said wrist band means including;

an upper compartment for housing a battery; and, a lower compartment integrally connected to said upper compartment for housing an alarm circuit;

circuit elements supported by said housing and electrically connected together to provide the desired alarm signal including;

circuit elements supported by said housing and electrically connected together to provide the desired alarm signal including;

said battery enclosed in said upper compartment;

an on-off switch mounted on said housing and electrically connected in series with said battery for switching said safety alarm device on during use and off during storage;

alarm means enclosed within said lower compartment and electrically connected to be energized by said battery;

circuit interuption means including a spring-loaded, normally-closed contact switch connected in series with said battery and alarm means, whereby said contact switch opens when the user engages the contact switch against a contact surface of said vehicle controls and said contact closes to connect said battery to said alarm means when the user's fingers relax away from said contact surface;

a battery test circuit enclosed in said lower compartment and connected in parallel with said battery, alarm means, and circuit interuption means for testing the charge condition of the battery, said test circuit including a test switch mounted on said housing and connected in series with a test light mounted on said housing, whereby when said test switch is activated said test light will illuminate if the charge condition of battery is satisfactory.

2. The apparatus of claim 1 wherein said alarm means includes a solid state electronic buzzer.

3. The apparatus of claim 2 further including an earphone jack mounted through said lower compartment of said housing and connected in parallel in said circuit and adapted to receive an earphone plug, an earphone connected to said earphone plug whereby when said alarm device is energized, the sound emitted by said electronic buzzer will be delivered to the user's ear.

4. The apparatus of claim 1 wherein said alarm means includes a buzzer and a wall of said housing lower compartment includes slots, to permit the sound emanating from said buzzer when it is energized to exit from said lower compartment and to be readily sensed by the user.

5. The apparatus of claim 1 wherein said on-off switch is mounted on said housing lower compartment and includes electrical contacts extending therethrough into said lower compartment.

6. The apparatus of claim 1 wherein said alarm device includes a light and further including a window means in said housing lower compartment to permit the light emanating from said lower compartment to be readily sensed by the user.

* * * * *

Disclaimer

4,361,834.—*Johnnie L. King*, Wagarville, Ala. SAFETY ALARM DEVICE. Patent dated Nov. 30, 1982. Disclaimer filed Aug. 24, 1984, by the inventor.

The term of this patent subsequent to July 31, 1998 has been disclaimed.
[*Official Gazette October 30, 1984.*]